(12) United States Patent
Abraham et al.

(10) Patent No.: US 11,874,868 B2
(45) Date of Patent: Jan. 16, 2024

(54) GENERATING AND PRESENTING MULTI-DIMENSIONAL REPRESENTATIONS FOR COMPLEX ENTITIES

(71) Applicant: Microsoft Technology Licensing, LLC, Redmond, WA (US)

(72) Inventors: Robin Abraham, Redmond, WA (US); Leo Betthauser, Kirkland, WA (US); Ziyao Li, Kirkland, WA (US); Jing Tian, Redmond, WA (US); Xiaofei Zeng, Redmond, WA (US); Maurice Diesendruck, Bellevue, WA (US); Andy Daniel Martinez, Redmond, WA (US); Min Xiao, Bothell, WA (US); Liang Du, Redmond, WA (US); Pramod Kumar Sharma, Seattle, WA (US); Natalia Larios Delgado, Kirkland, WA (US)

(73) Assignee: Microsoft Tech LLC nology Licensing, LLC, Redmond, WA (US)

( * ) Notice: Subject to any disclaimer, the term of this patent is extended or adjusted under 35 U.S.C. 154(b) by 74 days.

(21) Appl. No.: 17/347,097

(22) Filed: Jun. 14, 2021

(65) Prior Publication Data
US 2022/0398274 A1 Dec. 15, 2022

(51) Int. Cl.
*G06F 16/00* (2019.01)
*G06F 16/35* (2019.01)
(Continued)

(52) U.S. Cl.
CPC .......... *G06F 16/358* (2019.01); *G06F 16/383* (2019.01); *G06F 16/44* (2019.01); *G06F 16/45* (2019.01); *G06F 16/483* (2019.01)

(58) Field of Classification Search
CPC ...... G06F 16/358; G06F 16/383; G06F 16/44; G06F 16/45; G06F 16/483
See application file for complete search history.

(56) References Cited

U.S. PATENT DOCUMENTS

| 2006/0106847 A1* | 5/2006 | Eckardt, III | G06F 16/3323 |
| | | | 707/E17.093 |
| 2010/0145936 A1* | 6/2010 | Grinstein | G06F 3/0486 |
| | | | 715/769 |

(Continued)

OTHER PUBLICATIONS

"International Search Report and Written Opinion Issued in PCT Application No. PCT/US22/030151", dated Aug. 25, 2022, 10 Pages.

*Primary Examiner* — Syed H Hasan
(74) *Attorney, Agent, or Firm* — Ray Quinney & Nebeker; James Bullough

(57) ABSTRACT

The present disclosure relates to generating a complex entity index based on a combination of atomic and deep learned attributes associated with instances of a complex entity. For example, systems described herein generate a multi-dimensional representation of entity instances based on evaluation of digital content associated with the respective entity instances. Systems described herein further generate an index representation in which similarity of entity instances are illustrated and presented via an interactive presentation that enables a user to traverse instances of an entity to observe similarities and differences between instances of an entity that have similar embeddings to one another within a multi-dimensional index space.

20 Claims, 7 Drawing Sheets

(51) Int. Cl.
  *G06F 16/45*    (2019.01)
  *G06F 16/483*   (2019.01)
  *G06F 16/44*    (2019.01)
  *G06F 16/383*   (2019.01)

(56) References Cited

U.S. PATENT DOCUMENTS

| | | | |
|---|---|---|---|
| 2012/0278321 A1* | 11/2012 | Traub | G06F 16/3331 |
| | | | 707/E17.014 |
| 2013/0325869 A1* | 12/2013 | Reiley | G06F 16/437 |
| | | | 707/741 |
| 2014/0040275 A1* | 2/2014 | Dang | G06F 16/2228 |
| | | | 707/741 |
| 2015/0373281 A1* | 12/2015 | White | G06F 16/7867 |
| | | | 348/660 |
| 2018/0039647 A1* | 2/2018 | Winstanley | G06F 16/9535 |
| 2020/0272432 A1* | 8/2020 | Shaikh | G06F 8/76 |
| 2021/0034657 A1 | 2/2021 | Kale et al. | |
| 2021/0064624 A1* | 3/2021 | Carbune | G06Q 50/26 |
| 2022/0138231 A1* | 5/2022 | Misiewicz | G06F 16/951 |
| | | | 707/722 |
| 2022/0385974 A1* | 12/2022 | Phillips | G06F 18/22 |

* cited by examiner

US 11,874,868 B2

GENERATING AND PRESENTING MULTI-DIMENSIONAL REPRESENTATIONS FOR COMPLEX ENTITIES

BACKGROUND

Recent years have seen a significant increase in the use of computing device (e.g., mobile devices, personal computers, server devices) to create, store, and present data from various sources. Indeed, tools and applications for generating and presenting data are becoming more and more common. These presentation tools provide a variety of features for displaying data about particular entities. As entities become more complex, however, conventional data presentation tools have a number of limitations and drawbacks.

For example, while conventional presentation tools are often well equipped to display shallow signals about various entities, these signals generally provide limited utility in connection with notions of similarities between different instances of similar entities. As another example, conventional presentation tools often include applications for presenting data associated with a specific entity-type, but are often poorly equipped to present data associated with different entity types having significant differences in attributes. Moreover, conventional presentation tools often fail to provide interactive features that enable a variety of individuals of varying levels of experience in a particular entity domain to effectively traverse presentations of entity data.

These and other limitations exist in connection with generating and presenting data related to complex entities.

DETAILED DESCRIPTION

Figure 1:
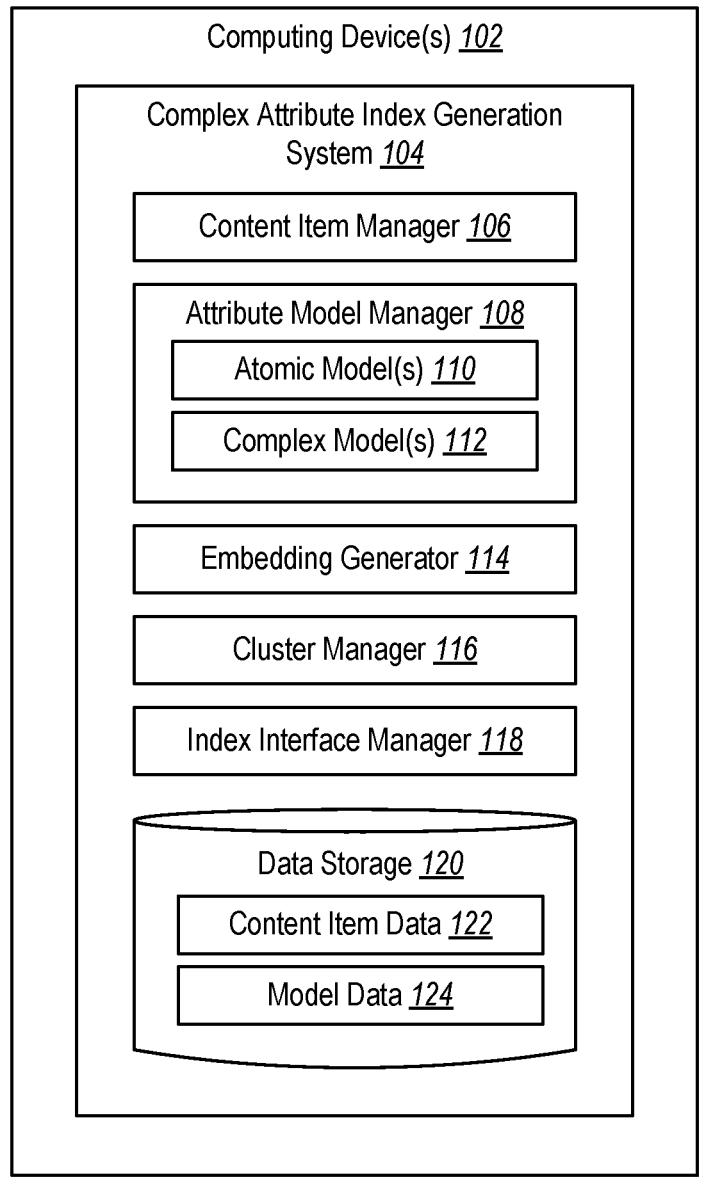
FIG. 1 illustrates an example environment including a complex entity index generation system in accordance with one or more embodiments.

The present disclosure relates to systems and models for generating a complex entity index based on a combination of atomic and complex (e.g., deep learned) attributes associated with instances of a complex entity (e.g., a plurality of instances that fit within a class defined by an entity class). In particular, one or more embodiments described herein relate to a complex entity index generation system (or simply "index generation system") that generates a multi-dimensional representation of entity instances based on evaluation of digital content associated with the respective entity instances. As will be discussed in further detail below, the index generation system can generate an index representation in which similarity of entity instances are illustrated and which are presented via an interactive presentation that enables a user to traverse instances of an entity to observe similarities and differences between instances of an entity that have similar embeddings to one another within a multi-dimensional index space.

As an illustrative example, one or more embodiments described herein relate to an index generation system that identifies a collection of digital objects (e.g., digital content items) of a variety of object-types associated with respective instances of a particular entity class from a wide variety of entity classes (e.g., multi-media content, medicines and other pharmaceuticals, oil well sites, businesses, sports franchises, etc.). As will be described below, the index generation system can identify any number of attributes associated with the respective entities including a combination of atomic attributes (e.g., metadata signals) as well as complex and deep learned attributes (e.g., machine learning predicted outputs). The index generation system may generate multi-dimensional representations of the respective entity instances and map a collection of instance representations to a multi-dimensional index space that provides notions of similarity between the entity instances based on a wide variety of the attributes assigned to the entity instances. The index generation system may additionally generate a presentation of the index that provides a visualization of similarity between similar instances and which allows a user to traverse various attributes and entity instances in an intuitive and user-friendly interface.

The present disclosure provides a number of practical applications that provide benefits and/or solve problems associated with generating and visualizing a complex entity index that provides notions of similarity based at least in part on deep-learned attributes associated with a collection of entity instances and which enables a user to traverse attributes and instances via a presentation of the complex entity index. By way of example and not limitation, some of these benefits will be discussed in further detail below.

For example, the index generation system may provide a notion of similarity between entity instances based on a wide variety of signals. For example, by generating a complex index based on a combination of atomic attribute signals and deep learned attribute predictions, the systems described herein can provide notions of similarity between attribute instances that are not conventionally considered similar. By way of example, in one or more implementations described herein, entity instances referring to oil well sites in two different countries may be determined to be more similar than oil well sites in close proximity based on complex signals that are conventionally not considered in determining notions of similarities between entity instances, and particularly where those entity instances are located at disparate locations.

In addition to providing a complex notion of similarity, the index generation system also provides a flexible model for comparing instances and generating embeddings that are not limited to a particular entity domain or type of entity instances. For example, systems described herein can be applicable to a wide variety of entity-types, such as multi-media entities, medicines, oil drilling, business entities, and other complex entities for which models may be trained and implemented for identifying deep-learned signals and/or atomic signals for respective instances of the entity-types. Indeed, while one or more embodiments described herein relate specifically to certain entity types (e.g., oil drilling sites, multi-media entities, medicines), features and functionalities described in connection with specific examples herein may apply to other examples in which complex indices can be generated and presented for a wide variety of entity-types.

In addition to generating an index that provides a visualization of embedding clusters and notions of similarity between entity instances, one or more implementations described herein include interactive features and functionality that enables a user to traverse the index in an intuitive and user-friendly way. For example, in one or more embodiments described herein, a user can traverse instances displayed via the index to better understand prominence of certain attributes within various embedding clusters. In addition, the systems described herein may provide ranked listings of entity instances in a way that enables a user to view details and attributes associated with entity instances that are most similar to one another based on a wide variety of attributes. One or more embodiments described herein further enable a user to add parameters and/or filter results of an index to discount certain attributes and modify the presentation of the entity index in a meaningful way to enable a user to obtain useful information about set of entity instances and/or specific attributes. Examples of some of these interactive features are discussed in further detail below.

In addition to the above, one or more embodiments of the systems described herein automate construction of explainable recommendation systems. These recommendation systems may be built from custom representation learning models for finding similar instances of a single entity, or for providing a notion of similarity between related instances of multiple entities. One or more embodiments described herein may further extract emerging similarities between model prediction behavior by measuring if relative positions of embedding clusters (e.g., attribute clusters) are preserved via decoder reconstructions.

One or more embodiments of the systems described herein may further identify similarities between multisets of raw inputs by leveraging statistical techniques on topologically similar embedding clusters. The systems described herein may identify these similarities across latent representations, thus removing the need for similarity matrices, graph alignments, and other multidimensional reduction pre-processing techniques. In one or more embodiments, the systems facilitate identifying representation learning opportunities to perform imitation learning for high latency models unable to be hosted in production via dimensionality reduction, clustering, and cooccurrences across multiple input signals.

As illustrated in the foregoing discussion, the present disclosure utilizes a variety of terms to described features and advantages of embodiments of an index generation system described herein. Additional detail will now be provided regarding the meaning of some of these terms.

For example, as used herein, an "entity," "complex entity," or "entity-class" may refer to an object class or category that includes a number of instances associated therewith. For example, an entity may refer to a type of object that may be analyzed using a combination of different models. As illustrative examples in accordance with one or more implementations described herein, an entity may refer to films of various types, oil wells, and medicines.

As used herein, an "instance" or an "entity instance" may refer to objects included within a corresponding entity. For example, a set of instances may refer to similar types of objects that are categorized within a specific entity-class or within a set of similar entity-classes. In accordance with the entities mentioned above, instances of film entities may refer to specific movies, movie clips, or other multi-media that falls within the category of films. Similarly, specific oil well sites may refer to instances of oil well entities. As a further example, medicine instances may refer to specific medications that fall within a broader category of medicines.

As used herein, an "attribute" may refer to any signal or value representative of a feature or characteristics of a corresponding instance. Attributes may refer to various types of attributes including, by way of example, atomic attributes and deep-learned or complex attributes and attribute predictions. As used herein, an "atomic attribute" may refer to an attribute that is identified based on metadata of an instance or based on a tagging or other signal that is previously associated with a digital content item associated with a corresponding entity instance. For example, where a digital content item refers to a document or multi-media file, an atomic attribute may refer to a file name, size, source, or other tagged metadata associated with the digital content item. Other examples of atomic attributes may include tagged data such as, in the case of an oil drilling site, a geographic location, a brand of drill, or other simple signal associated with the entity instance.

In contrast, a deep-learned attribute, a complex attribute, or a predicted attribute may refer interchangeably to an attribute based on content of a digital content item or other complex signal(s) associated with an entity instance. By way of example, a deep-learned attribute may refer to a variety of inputs and/or outputs of one or more deep learning models (e.g., machine learning models). In one or more embodiments, complex attributes refer to predicted attributes for an instance based on a predicted output generated by a deep learning model. For instance, while an atomic attribute may refer to a signal indicating a piece of metadata or other observed or measured characteristic associated with a corresponding instance, a complex attribute may refer to a predicted or estimated feature or characteristic associated with an instance. For instance, a complex attribute may refer to a predicted outcome for a particular instance (e.g., a predicted history for an oil well site, a predicted medical history for an individual or medicine) based on any number of signals that are provided as inputs to a deep learning model(s).

As noted above, attributes may be associated with a variety of digital content items associated with corresponding instances of a variety of entity-types. For example, where a digital content item refers to a video file, a deep-learned or otherwise complex attribute may refer to predicted features of the video content, such as a mood, an observation of day or night-time, a prediction of slow or fast cuts within various scenes, and any other wide variety of signals that may be predicted or estimated from the content of the video files. In an example involving medicine, complex signals may refer to predicted side-effects, likelihood of causing cancer, or other similarly complex signals based on outputs (e.g., predictions, estimations) of deep-learning models.

As used herein, an "embedding" may refer to a multi-dimensional representation for an entity instance. For example, an embedding may refer to a set of numeric values representative of attributes corresponding to an entity instance. In one or more embodiments, an embedding includes a multi-dimensional vector having values that are calculated or otherwise determined based on attributes output from a plurality of attribute models. As will be discussed in connection with one or more embodiments herein, the embeddings may include any number of numeric values representative of specific attributes or combinations of multiple attributes as determined by one or more embedding models that are trained to output numeric values representative of the attribute(s) and generate the respective embeddings corresponding to the specific instances.

In one or more embodiments described herein, digital objects or content items (e.g., digital content items) are evaluated using a variety of models to identify various attribute signals associated with a corresponding entity instance. As used herein, a "digital object," "content item," or "digital content item" may refer interchangeably to any set of digital data such as documents, text files, audio files, image files, video files, webpages, executable files, binaries, etc. In one or more embodiments, a digital content item refers to a set of multiple files (e.g., a folder) associated with a particular entity. Digital content items may refer to content of different file types based on entity-types of an entity instance with which the digital content item(s) are associated. For example, where an entity-class refers to a medicine, a digital content item may refer to any number of files or content items that make up a medical history for an individual or associated with a particular instance of a medicine. Where an entity-class is films, a digital content item may refer to movies, video files, audio files, or snippets of film associated with a corresponding film instance. Indeed, as will be discussed in connection with various examples herein, a digital content item may refer to any set of data associated with a corresponding entity instance.

As used herein, an "entity index" or simply "index" may refer to a representation of attribute values for a collection of instances associated with an entity. For example, in one or more embodiments, an index refers to a listing or collection of multi-dimensional representations or embeddings having numerical values representative of attributes that are associated with respective entity instances. As will be discussed in further detail herein, an entity index may be presented via a graphical user interface in a variety of ways to visualize notions of similarity of attributes within or between embedding clusters associated with various groupings of attribute signals and embedding values.

Additional detail will now be provided regarding an index generation system in accordance with one or more example implementations. For example, FIG. 1 illustrates an example block diagram showing an environment having one or more computing devices 102 on which a complex entity index generation system 104 (or simply, an "index generation system 104") may be implemented in accordance with one or more embodiments. It will be understood that while FIG. 1 shows a single block representative of one or more computing device(s), components of the index generation system 104 may be implemented across any number of computing devices.

As shown in FIG. 1, the index generation system 104 may include a number of components and subcomponents implemented thereon. For example, as shown in FIG. 1, the index generation system 104 may include a content item manager 106. The index generation system 104 may additionally include an attribute model manager 108, which may include one or more atomic model(s) 110 and one or more complex model(s) 112). The index generation system 104 may additionally include an embedding generator 114, cluster manager 116, and index interface manager 118. In one or more embodiments, the index generation system 104 includes a data storage 120 having content item data 122, model data 124, and any other data thereon that is accessible to any of the additional components 106-118 of the index generation system 104.

The computing device(s) 102 may refer to various types of computing devices. For example, the computing device 102 may include a mobile device such as a mobile telephone, a smartphone, a PDA, a tablet, or a laptop. Additionally, or alternatively, the computing device 102 may include a non-mobile device such as a desktop computer, a server device, or other non-portable device. In one or more embodiments, the computing device(s) 102 includes one or more Internet of Things (IoT) devices. The computing device(s) 102 may include features and functionality described below in connection with an example computing device illustrated in FIG. 6.

While FIG. 1 illustrates an example in which the index generation system 104 is implemented on a single device, it will be appreciated that one or more of the components of the index generation system 104 may be implemented on the same or across multiple devices. For example, one or more models (e.g., atomic models 110, complex models 112) may be implemented on various edge devices, IoT devices, etc. while other components are implemented on a cloud computing system. Other components may be implemented across multiple cloud computing and/or client devices. For example, as will be discussed below, the index interface manager may be implemented across multiple devices (e.g., a cloud computing device that provides index data to be displayed on a client device).

In accordance with one or more embodiments described herein, the index generation system 104 may provide features and functionality related to evaluating digital content items, generating an entity index, and providing a presentation of the entity index to a user. Additional detail will now be discussed in connection with various components of the index generation system 104 shown in FIG. 1.

As mentioned above, the index generation system 104 may include a content item manager 106. The content item manager 106 may collect or otherwise identify any number of digital content items associated with a corresponding entity. For example, the content item manager 106 may receive or otherwise obtain a collection of digital content items associated with one or more instances of an entity class. The content item manager 106 may receive or otherwise collect the digital content items from a variety of sources.

In one or more embodiments, the content item manager 106 accesses the digital content items from a database of previously collected content items associated with any number of entity instances associated with a particular entity class. Alternatively, in one or more embodiments, the content item manager 106 receives digital content items and associated with received items with corresponding entity classes to be evaluated using various models associated with the corresponding entity classes. For example, the content item manager 106 may receive a collection of digital content items and associated the digital content item(s) with corresponding entity instances.

In one or more embodiments, the content item manager 106 manages collections of content items associated with two or more classes of entities. Where two entities may share some similarities or otherwise have overlap in entity-instances within the respective entity groupings, the content item manager 106 may group or otherwise associate one or more digital content items within different entity classes.

As further shown in FIG. 1, the index generation system 104 may include an attribute model manager 108. As further shown, the attribute model manager 108 may make use of one or more atomic model(s) 110 and one or more complex model(s) 112. The respective models 110-112 may refer to algorithms or models that are trained to identify features and characteristics about the digital content items collected for a given entity instance. For example, the models 110-112 may evaluate digital content items, including metadata and/or content of the respective digital content items to determine various attributes associated with an instance associated with the digital content item(s).

In one or more embodiments, the atomic model(s) 110 may be used to identify a first type of one or more attributes associated with the entity instances. For example, in one or more embodiments, the atomic model(s) 110 may refer to models or algorithms trained to identify atomic signals based on metadata tags or other data associated with a digital content item. By way of example, atomic model(s) 110 may be trained to identify atomic signals including location tags, file source tags, table of content tags, title tags, file name tags, or other associated tags. In one or more embodiments, the atomic signals are manually identified based on tags that have been manually added to the content items. (e.g., timestamps, bookmarks, etc.)

In one or more embodiments, the complex model(s) 112 may be used to identify a second type of one or more attributes different from the first type of attribute(s) identified using the atomic model(s) 110. For example, the complex model(s) 112 may refer to deep learning models that are trained to evaluate digital content items associated with given entities and generate deep learned or otherwise complex outputs (e.g., deep-learned attributes) based on content of the digital content items. For example, the complex model(s) 112 may include any number and variety of deep learning models that are trained to evaluate content of one or multiple digital content items associated with a given instance and determine a corresponding complex attribute associated with the digital content item(s) and associated entity instance.

As shown in FIG. 1, the index generation system 104 additionally includes an embedding generator 114. In one or more embodiments, the embedding generator 114 generates embeddings for any number of instances for a particular entity class. For example, in one or more embodiments, the embedding generator 114 receives any number of attribute signals from the models 110, 112 and generate multi-dimensional representations of the entity instances based on a combination of the attribute signals.

As noted above, the embedding generator 114 may collect any number of attribute signals associated with corresponding entity instances. In one or more embodiments, the embedding generator 114 generates a record or a storage of attribute signals associated with corresponding entity instances. This record may include any number of outputs generated by the models of the attribute model manager 108 that are trained to analyze digital content items and generate various outputs. As will be discussed in further detail below, the embedding generator 114 can generate and maintain a record of the instances and associated attribute signals that have been compiled or otherwise collected for the corresponding digital content items.

Upon collecting and compiling the attribute signals associated with the corresponding entity instances, the embedding generator 114 can apply an embedding model trained to generate embeddings for a collection of entity instances. For example, the embedding generator 114 may utilize a representation learning model (or other model trained to output an embedding that encodes a notion of similarity).

As noted above, the embeddings may refer to a multi-dimensional set of values associated with the instance. In one or more embodiments, the multi-dimensional set of values refers to a vector of numerical values indicating a point in a multi-dimensional space. In one or more embodiments, the number of values within the embeddings correspond to a number of attribute signals associated with instances of an entity class. Alternatively, in one or more embodiments, the number of values within the embeddings are determined based on one or more algorithms or parameters utilized by models of the embedding generator 114.

The embedding generator 114 can generate the embeddings in a variety of ways. In one or more embodiments, the embedding generator 114 implements an embedding model trained to reconstruct the outputs of the atomic and/or complex models 110-112. For example, the embedding generator 114 may be trained to generate numeric values based on the attribute outputs from the attribute models 110-112. These numeric values may be based on content and/or metadata of the digital content items. As mentioned above, the resulting embeddings may include vectors having any number of values based on a number of attribute signals generated by the attribute model manager 108.

In one or more embodiments, the embedding generator 114 generates outputs based on combinations of various attributes to generate a multi-dimensional representation of numeric values that represent one or more combinations of attributes associated with the instance. In one or more embodiments, the embedding generator 114 generates one or more numerical values for each of the outputs generated by the atomic and/or complex models 110-112. In one or more embodiments, the embedding generator 114 generates one or more numerical values based on combinations of the outputs of the models 110-112. In one or more embodiments, the embedding generator 114 generates multi-dimensional representations having a predetermined number of values to maintain uniformity between instances of the respective entities (e.g., even where certain instances may have a higher number of attribute signals associated therewith).

As shown in FIG. 1, the index generation system 104 further includes a cluster manager 116. In one or more embodiments, the cluster manager 116 determines or otherwise identifies embedding clusters based on numerical values of the embeddings. For example, in one or more embodiments, the cluster manager 116 maps the generated embeddings to points on an n-dimensional space (e.g., on the entity index) corresponding to a number of values included within the corresponding embeddings. For ease in explanation, example index representations will be described herein in connection with two-dimensional spaces (e.g., showing mappings or placement of embeddings having two values that are plotted on a two-dimensional space). Nevertheless, it will be appreciated that one or more implementations may include embeddings that are plotted on a space having three or more dimensions based on the embeddings having more than two numerical values representative of a set of attributes.

In one or more embodiments, the cluster manager 116 evaluates placement of the embeddings within the multi-dimensional space to determine embedding clusters. For example, the cluster manager 116 may apply a density model or other cluster identification model to identify sets of embeddings that are within a predetermined proximity of one another. In one or more embodiments, this may include identifying threshold quantities of embeddings that are within some spatial distance from one another when plotted on the multi-dimensional space. Other implementations may identify variable sizes of embedding clusters based on a parameter indicating a predetermined (e.g., a minimum or maximum number) of embeddings that are proximate to an arbitrary point of the entity index. As will be discussed in further detail below, embedding clusters may have a variety of sizes and shapes depending on parameters that the cluster manager 116 uses in defining the respective embedding clusters.

As shown in FIG. 1, the index generation system 104 may additionally include an index interface manager 118. The index interface manager 118 may provide features and functionality related to presenting an index via a graphical user interface on a computing device (e.g., a client device). For example, the index interface manager 118 may generate a visual representation of an index showing points that are plotted within a multi-dimensional space (e.g., a two or three dimensional space) representing embeddings associated with entity instances.

In one or more embodiments, the index interface manager 118 generates and presents a ranked list including indications of embeddings and associated instances. For example, where one or more embedding clusters are identified, the index interface manager 118 may generate and present a list of embeddings in order of proximity from a center point of a given embedding cluster. In addition, or as an alternative, the index interface manager 118 may generate and present a list of embeddings and associated instances based on a selected instance or embedding. For example, in response to a user selecting an instance (e.g., from a displayed index), the index interface manager 118 may provide a listing of associated instances in order of proximity from the selected instance within the multi-dimensional space of the entity index. One or more embodiments describing example features and functionality of the index interface manager 118 is discussed in further detail below.

As shown in FIG. 1, the index generation system 104 further includes a data storage 120. The data storage 120 may refer to a database or other storage volume accessible to one or more of the components 106-118 of the index generation system 104. The data storage 120 may be maintained remotely (e.g., on a cloud computing system) or on a local storage of device(s) having one or more of the components 106-118 implemented thereon.

As shown in FIG. 1, the data storage 120 may include a variety of data thereon. For example, the data storage 120 may include content item data 122. The content item data 122 may include the digital content items provided to the various models 110-112 of the attribute model manager 108. Further, the content item data 122 may include any data associated with the respective digital content items (e.g., metadata). In one or more embodiments, the content item data 122 includes any signal considered by (e.g., inputs, parameters) the various models 110-112. Indeed, the content item data 122 may include any information associated with the digital content items and/or specific instances of a corresponding entity class.

As further shown, the data storage 120 may include model data 124. The model data 124 may refer to algorithms, parameters, and any other information used by the various models and algorithms described herein to determine attributes and/or values considered by the index generation system 104. For example, the model data 124 may refer to any data associated with the atomic model(s) 110 and/or the complex model(s) 112. The model data 124 may further include any information associated with models for generating embeddings (e.g., embedding models) and/or models used for identifying or otherwise determining embedding clusters.

Figure 2A:
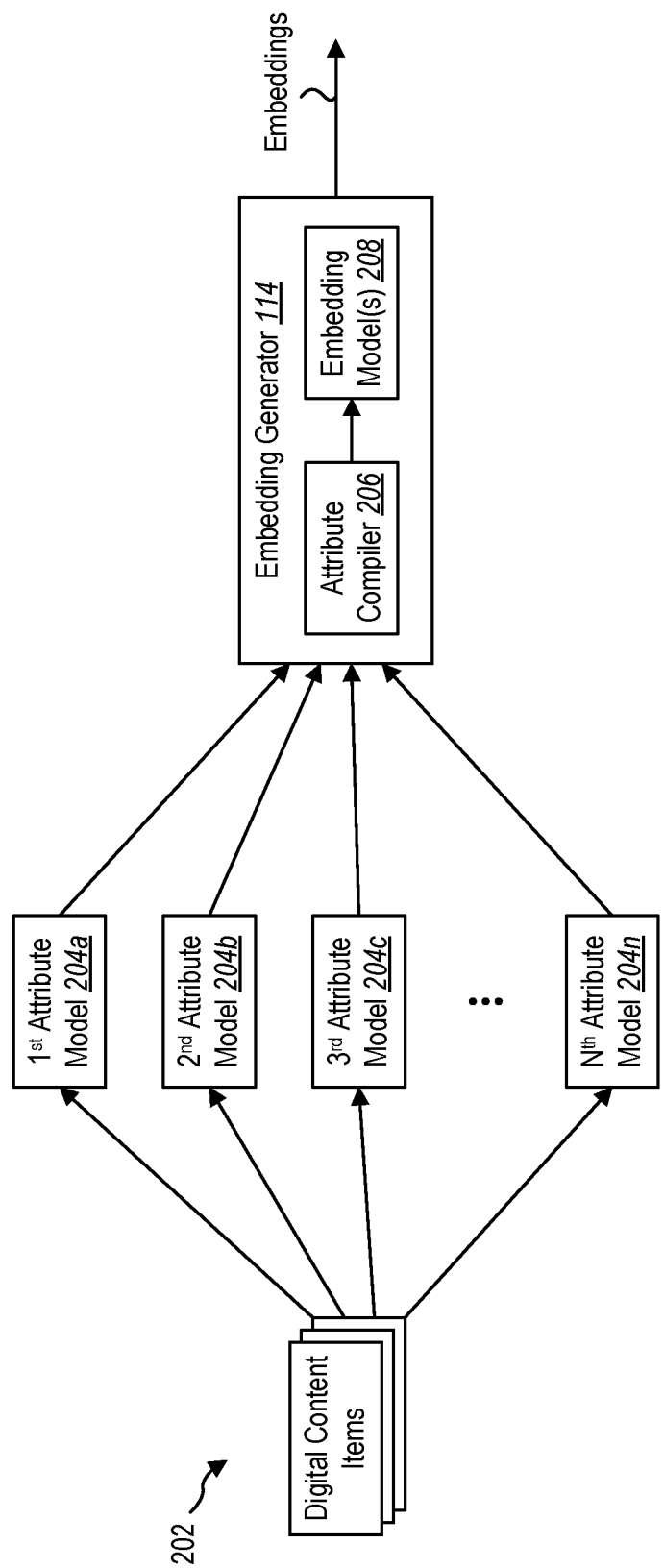
FIGS. 2A-2B illustrates an example workflow showing an example implementation in which the complex entity index generation system generates and presents a complex entity index in accordance with one or more embodiments.

Additional detail will now be discussed in connection with a workflow showing an example implementation of the index generation system 104 in accordance with one or more embodiments. For example, FIG. 2A shows an example implementation in which a collection of digital content items 202 are provided to a plurality of attribute models 204*a-n* that are trained to generate outputs associated with attributes of the collection of digital content items 204*a-n*. In this example, the digital content items 202 may refer to a set of digital content items that are associated with a corresponding entity (or similar types of entities). By way of example, the digital content items 202 may refer to video clips, images, documents, and other content items associated with one or more multi-media entity types. For instance, the digital content items 202 may refer to multi-media instances associated with movies, episodes, or any other videos that may be grouped within a specific entity-class or across multiple entity classes of similar multi-media types.

In one or more embodiments, the attribute models 204*a-n* include a combination of different types of models. For example, in one or more embodiments, the attribute models 204*a-n* include one or more atomic models that are trained or otherwise programs to determine atomic attributes based on metadata or other data that is associated with a digital file including the digital content. To illustrate, where the digital content items 202 refer to video clips, the attribute models 204*a-n* may include atomic models that are trained or otherwise configured to identify file data (e.g., metadata), such as a file type, one or more timestamps, a date and/or location associated with the digital file, etc. In addition, the atomic models may include models trained to identify tagged data, such as manually identified information, such as user-added bookmarks, manually added timestamps, indications of actors or characters associated with the video clips, a director or creator of the video clip, etc.

In addition to atomic models, the attribute models 204*a-n* may include one or more deep learning models to identify deep learned signals or other information associated with the digital content item(s). For example, where the digital content items 202 refer to video clips, the attribute models 204*a-n* may include deep learning models or machine learning models that are trained or otherwise configured to generate predictions or estimates associated with content of the video clips. For example, the attribute models 204*a-n* may include one or more models for estimating cut scenes, models for predicting whether a scene is filmed during a day or night (or indoors v. outdoors), models for predicting whether a film is an action film, a romance film, a drama, or some combination of multiple genres. Indeed, as mentioned above, the attribute models 204*a-n* may include any number and variety of models that are trained to predict or otherwise output an estimation associated with the digital content item(s).

As shown in FIG. 2, upon generating the various attribute signals (e.g., atomic signals and/or complex attribute signals), the attribute models 204*a-n* may provide the attribute signals to the embedding generator 114 for further processing. In one or more embodiments, the attribute models 204*a-n* provide the attribute signals to an attribute compiler 206. In accordance with one or more implementations described above, the attribute compiler 206 can compile any number of attribute and associate the identified attribute signals with associated digital content items. In one or more embodiments, the attribute compiler 206 can associate the attribute signals with corresponding entity instances and associated entity classes.

In one or more embodiments, the attribute compiler 206 simply associates the attribute signals with corresponding digital content items and/or instances by tagging instances with the associated attribute signals. In one or more implementations, the attribute compiler 206 generates a record including records (e.g., tables, documents, or other data objects) that identify specific instances and associated attribute signals stored in conjunction with one another. As will be discussed below, this compiled record of instances and associated attribute signals may be used to generate one or more embeddings for the instances.

For example, as shown in FIG. 2A, the attribute compiler 206 may provide information indicating a collection of entity instances and associated attribute signals to one or more embedding model(s) 208. The embedding model(s) 208 may be applied to the entity instances and associated attribute signals to generate a number of values associated with the attribute signals. In particular, the embedding model(s) may generate a number of numeric values to include within an embedding (e.g., a multi-dimensional representation) in which the numerical values are representative of one or multiple attribute signals determined by the attribute models 204a-n.

In one or more embodiments, the embedding model(s) 208 may generate embeddings including vectors or other data objects having a quantity of values that represent each of the attribute signals output by the attribute models 204a-n. In one or more embodiments, the embedding model(s) 208 may generate values to include within embeddings based on a combination of multiple attribute signals output by one or multiple attribute models 204a-n. In one or more implementations, the embedding model(s) generate values based on combinations of outputs from the attribute model(s) 204a-n as well as various signals or other data that are provided as inputs or other parameters to the respective attribute models 204a-n. As noted above, the embedding model(s) 208 may generate embeddings including numerical values that represent atomic signals, deep learned signals, or a combination of multiple types of attribute signals.

As shown in FIG. 2A, the embedding generator 114 may output embeddings based on the attribute signals compiled for a collection of entity instances. In one or more embodiments, the embedding generator 114 generates an embedding for each instance of a corresponding entity class. In one or more embodiments, the embedding generator 114 generates an embedding for each instance for which a digital content item is received. As noted above, the embedding generator 114 may determine and output embeddings for a specific entity class or for instances across multiple entity classes (e.g., related and/or independent entities).

Figure 2B:
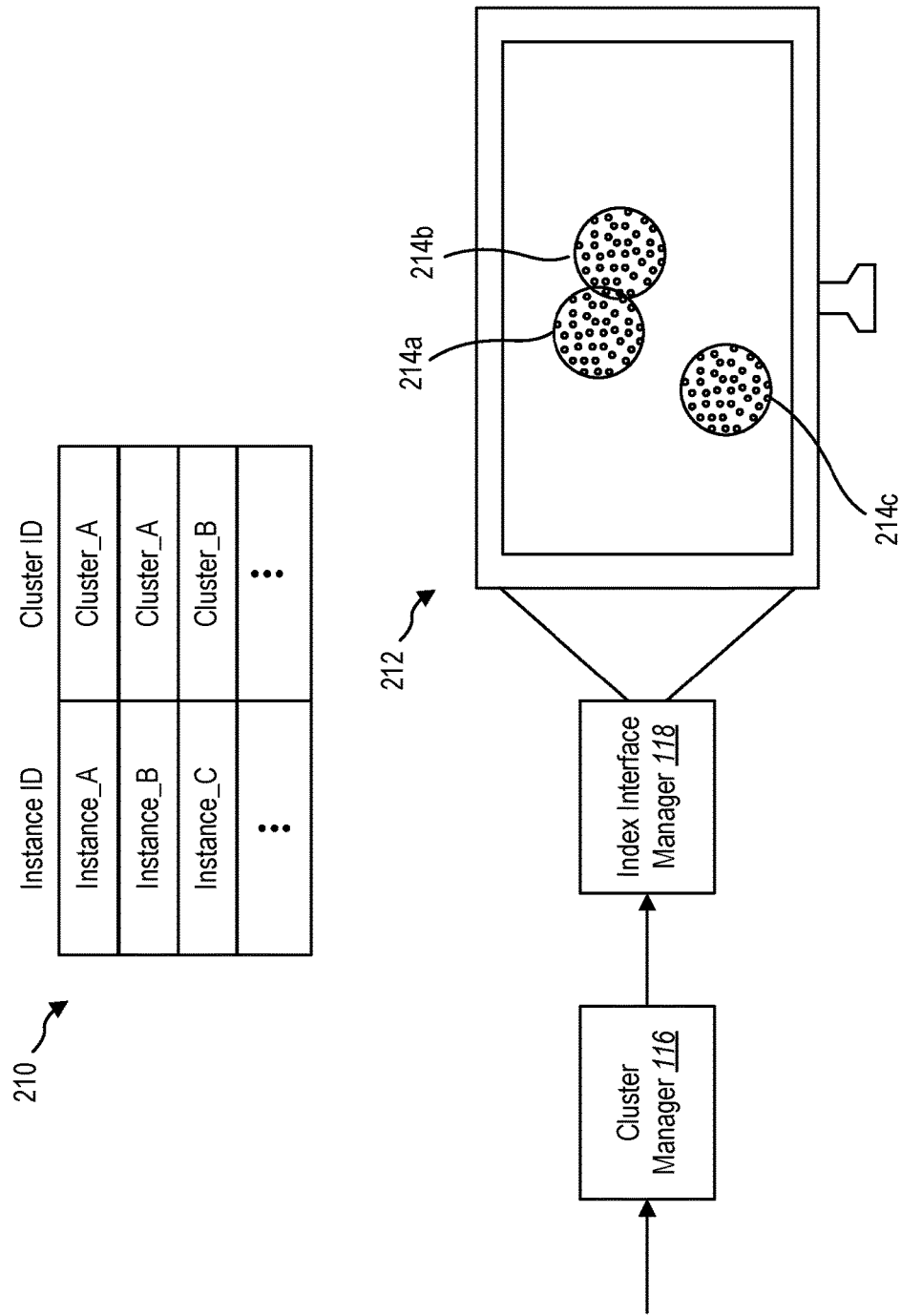

As shown in FIG. 2B, the generated embeddings may be provided to a cluster manager 116 for further processing. In particular, as discussed above, the cluster manager 116 may generate or otherwise determine embedding clusters including some number of embeddings that are within a proximity to one another. More specifically, the cluster manager 116 may identify subsets of embeddings from a collection of embeddings for a corresponding entity that have corresponding values (e.g., numerical values) that fall within a spatial proximity to one another when plotted on a multi-dimensional index, which may be based on a number of values included within each of the embeddings. As noted above, these clusters of embeddings provide a notion of similarity between instances of an entity corresponding to the embeddings within the respective embedding cluster(s).

In one or more embodiments, the cluster manager 116 utilizes outputs from representation learning models (e.g., the embedding model(s) 208), which may refer to any model which outputs an embedding that encodes a notion of similarity. The cluster manager 116 may further cluster the results of each model's latent representation for derived attributes. It will be noted that when categorical model predicts are available, the cluster manager 116 may opt to use a prediction label rather than a cluster identifier as a prediction head can carve out disconnected or non-convex regions of an embedding space (e.g., an index space). This mapping allows the cluster manager 116 to map each row in a tabular dataset where each column value represents a quantized similarity for each derived attribute of the entity.

The cluster manager 116 may identify the embedding clusters in a variety of ways. In one or more embodiments, the cluster manager 116 utilizes an unsupervised or topologically driven approach in which embedding clusters are generated with similar geometric properties regardless of the original embedding dimension. For example, the cluster manager 116 may leverage a mathematically sound approach with a fixed kernel rather than a fixed number of clusters. This clustering process may utilize embeddings to reveal similarities for model predictions for the same entity at the embedding level without requiring a prediction of a specific derived attribute and thus cluster other clustering techniques with approximate important characteristics of an entity (e.g., such as, in an example of an entity including medicine, molecules being associated with effective treatments, allergens, expense of production, etc.).

In one or more embodiments, the cluster manager 116 maps each embedding (i.e., each entity) to a respective cluster or predicted label(s). For example, as shown in FIG. 2B, the cluster manager 116 may generate a cluster record 210 including any number of rows in which instances of corresponding entities are associated with a corresponding entity cluster. As illustrated in FIG. 2B, a first instance (Instance_A) may be associated with a first cluster (Cluster_A), a second instance (Instance_B) may be associated with the first cluster (Cluster_A, and a third instance (Instance_C) may be associated with a second cluster (Cluster_B). The cluster record 210 may include any number of instances associated with any number of embedding clusters.

After mapping the embeddings to the embedding clusters, the cluster manager 116 may utilize a series of gated linear units that are trained using a masked language model technique to encode each row (e.g., where each row represents an embedding associated with a corresponding cluster) as a vector. This vector can be used to reconstruct entity cluster representations, which allows for quick and explainable retrieval of similar entities by computing a weighted distance using an attention-like mechanism that points to each column, which in turn corresponds to a notion of similarity encoded by the attribute models.

As shown in FIG. 2B, and as will be discussed in further detail below, the cluster information may be provided to an index interface manager 118 for further processing in connection with presenting an entity index. In particular, as noted above, the index interface manager 118 may provide a presentation of an entity index showing placement of embeddings within a multi-dimensional space to illustrate a notion of similarity between instances of an entity based on a combination of attribute signals associated with the respective entity instances. In this example, the index interface manager 118 generates a presentation to display via a graphical user interface on a client device 212. While FIG. 2B shows an example in which the presentation illustrates embeddings displayed via a two-dimensional space, other implementations may involve providing a presentation showing additional dimensions.

As shown in FIG. 2B, the embeddings are represented by dots that are plotted at locations corresponding to spatial clusters. In particular, the index interface manager 118 may provide an indication of embedding clusters showing groupings of embeddings associated with sets of attributes that are more similar to one another than other instances of an entity. In the example shown in FIG. 2, the index interface manager 118 may indicate a first embedding cluster 214a associated with a first grouping of embeddings, a second embedding cluster 214b associate with a second grouping of embeddings, and a third embedding cluster 214c associated with a third grouping of embeddings. As shown in FIG. 2B, the embeddings may be independent from one another (i.e., having no shared embeddings) or may include one or more embeddings in common between respective embedding clusters.

As noted above, the embedding clusters may include groupings of embeddings based on a combination of factors. In one or more embodiments, the index generation system 104 determines the embedding clusters based on a threshold number of embeddings within a predetermined proximity of some center point (e.g., representative of a set of embedding values). In one or more embodiments, the index generation system 104 determines the embedding clusters based on an observed density of embeddings within the index space. In the example shown in FIG. 2B, the embedding clusters may refer to circular shaped clusters (or some shape having a uniform absolute distance from a center point). Alternatively, in one or more embodiments, the embedding clusters may have different shapes as may serve an alternative notion of similarity or that may otherwise be used to classify a similar set of embeddings.

Figure 3A:
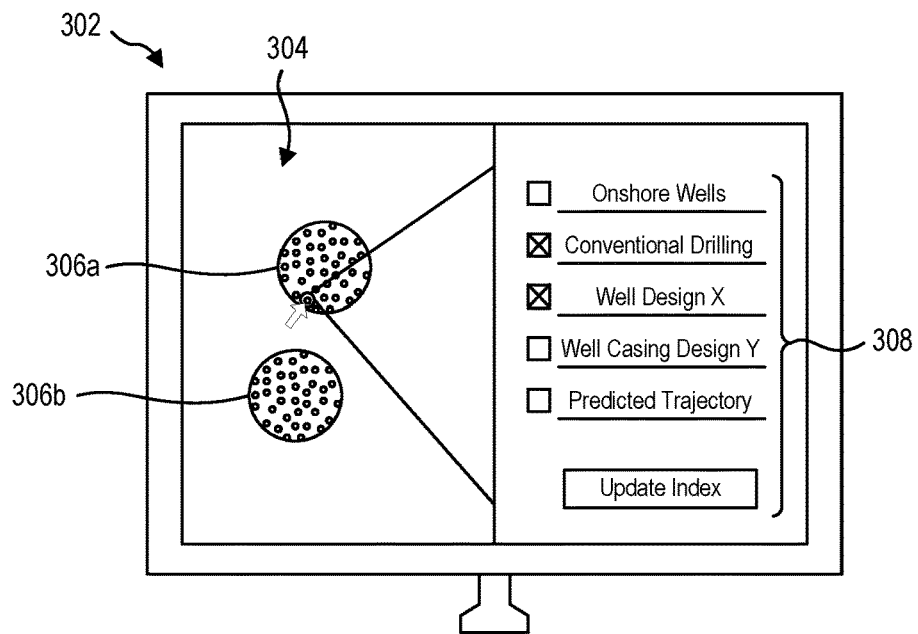
FIGS. 3A-3B illustrate example presentations of a complex entity index in accordance with one or more embodiments.
Figure 3B:
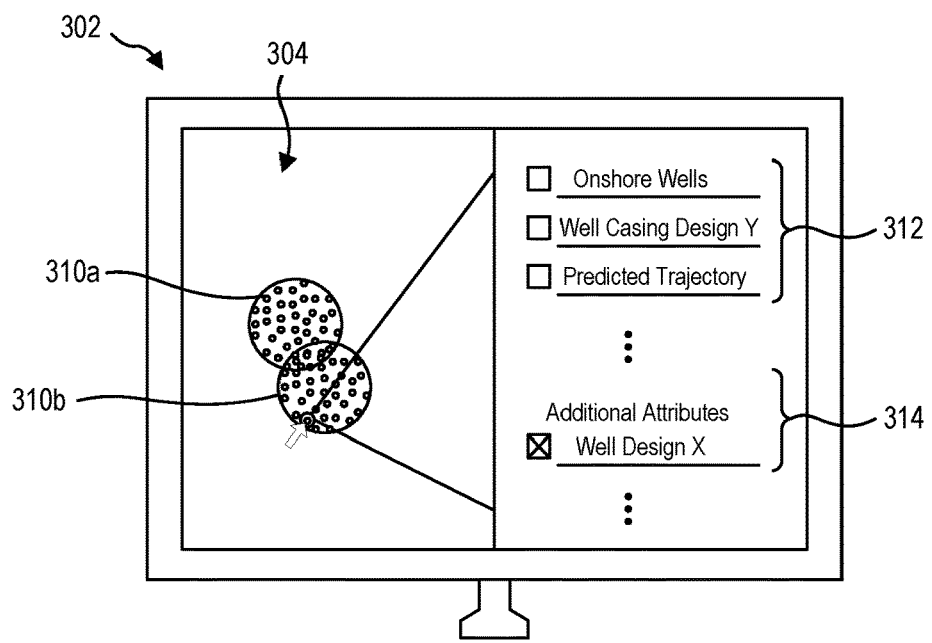

FIGS. 3A-3B illustrate example implementations showing various features that the index generation system 104 may incorporate in generating and providing a presentation of an index showing a visual representation of embeddings and embedding clusters. For example, FIG. 3A shows an example client device 302 having a graphical user interface 304 within which the index generation system 104 may provide a presentation of an entity index. In particular, as shown in FIG. 3A, the index generation system 104 provides a presentation showing two embedding clusters 306a-b based on similarity of the embeddings included within the shown clusters.

In this example, the index generation system 104 may enable a user of the client device 302 to interact with the presentation and select one or more embeddings. In response to detecting a selection of an embedding (e.g., within the first embedding cluster 306a), the index generation system 104 may provide a listing of attributes 308 associated with the instance that corresponding to the selected embedding. The resulting listing may include any number of attributes associated therewith. For example, the displayed listing of attributes 308 may include signals output from the various models used to evaluate digital content items associated with corresponding entity instances.

The listing of attributes 308 may include a variety of atomic attributes and deep learned attributes. For example, in this example, the selected embedding may be associated with an oil well site. The resulting listing of attributes 308 may therefore include a variety of identified attributes including, by way of example, an indication of onshore wells (e.g., rather than offshore wells), an indication of conventional drilling (e.g., rather than non-conventional drilling, such as fracking), an indicated well design (e.g., well design X), an indicated well casing design (e.g., well casing design Y), and a predicted trajectory.

The listing of attributes 308 may include any number of additional attributes associated with the selected instance. Further, the listing of attributes 308 may include a combination of atomic and deep-learned attributes. For example, as shown in FIG. 3A, the listing of attributes may include atomic attributes, such as the indication of onshore wells, and the indication of conventional drilling. As further shown, the listing of attributes 308 may include deep-learned or otherwise predicted attributes based on various signals or inputs to the collection of attribute models, such as a predicted well design, a predicted well casing design, and a predicted trajectory.

In one or more embodiments, the index generation system 104 may selectively provide the listing of attributes 308 based on attributes that were determinative or most prevalent in the generated clusters 306a-b. For example, the listed attributes may include an ordered list of attributes 308 in order of prevalence or any other criteria within a given cluster. For example, where one or more attributes are weighted more heavily than other attributes in generating the embeddings, the listing of attributes 308 may provide the attributes in a ranked order based on the associated weights.

As shown in FIG. 3A, the index generation system 104 may provide icons that enable a user to traverse various views of the cluster(s) and attribute information of the various embeddings. For example, as shown in FIG. 3A, a user may select or deselect one or more attributes (e.g., conventional drilling and well design). In response, the index generation system 104 may update the index or re-render a visualization of the embedding cluster(s) based on removal of one or more attributes. For example, in response to deselecting the attributes of conventional drilling and well design, the index generation system 104 may update the index view and provide a display of new or updated clusters with the deselected attributes no longer being considered in the notion of similarity between the embeddings.

FIG. 3B shows an example updated view of the index. For example, based on the deselected attributes, the index generation system 104 may provide an updated presentation including a new first cluster 310a and second cluster 310b including many of the same and/or different embeddings from a collection of embeddings corresponding to a particular entity. In this example, the index generation system 104 may provide an updated listing of attributes including a first subset of attributes 312 that were considered in generating the updated embedding clusters and a second subset of attributes 314 indicating one or more attributes that were not considered in generating the attribute clusters.

While FIG. 3B shows an example in which the same listing of attributes are used in generating the resulting embedding clusters, the index generation system 104 may consider fewer or additional attributes in generating the updated clusters. For example, the index generation system 104 may provide a new listing of attributes based on one or more new attributes having a bigger impact in the resulting clusters for the updated clusters than the clusters from the first view prior to the updated display. Moreover, while FIG. 3B shows an example in which the additional attributes listed are limited to the attributes that were deselected from FIG. 3A, the index generation system 104 may provide any number of additional attributes that a user may add for consideration and generating an updated index presentation. While not shown in FIGS. 3A-3B, in one or more embodiments, a user may manually search one or more attributes to better explore notions of similarity between a collection of instances.

Figure 4:
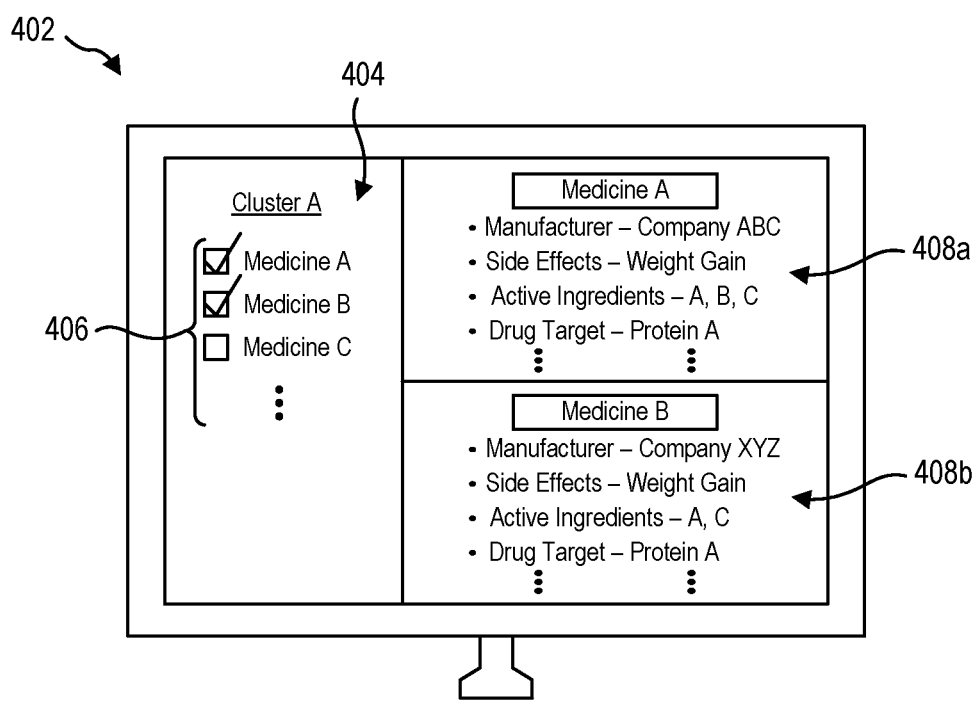
FIG. 4 illustrates another example presentation of a complex entity index in accordance with one or more embodiments.

Moving on, FIG. 4 illustrates another example implementation of an index presentation in accordance with one or more embodiments. In particular, FIG. 4 illustrates an example implementation showing an example client device 402 and a graphical user interface 404 within which an index presentation is displayed. In this example, the index generation system 104 provides an index presentation associated with instances of medicine (e.g., specific medications or drugs) within an entity class of medicine (or other similar entity category).

In one or more embodiments, the index generation system 104 provides a ranked list of instances 406 (or embeddings) based on proximity of associated embeddings to a reference point in a multi-dimensional index space. In this example, the index generation system 104 may provide a ranked list of instances 406 based on proximity to a mid-point of an embeddings cluster. Alternatively, in one or more embodiments, the index generation system 104 may provide a ranked list of instances 406 based on proximity to a selected instance (e.g., in response to a selection of medicine A).

As further shown, the index generation system 104 may provide information associated with one or more respective instances based on selection of those instances within the ranked list of instances 406. For example, in response to detecting a selection of a first medicine instance (Medicine A), the index generation system 104 may provide an attribute display 408a showing some or all attributes (or some of the most prevalent attributes) associated with the selected instance. In one or more embodiments, the index generation system 104 provides multiple attribute displays 408a-b based on selection of multiple instances within the ranked list of instances 406. It will be appreciated that a user of the client device 402 may select any number of instances to view a side-by-side of the associated attribute displays 408a-b.

In the illustrated example, a first attribute display 408a associated with a first instance of medicine (Medicine A) shows a manufacturer (Company ABC), side effects (e.g., weight gain), active ingredients (e.g., ingredients A, B, and C), and a drug target (e.g., protein A). Similarly, a second attribute display 408b associated with a second instance of medicine (Medicine B) shows a manufacturer (Company XYZ), side effects (e.g., weight gain), active ingredients (A, C), and a drug target (e.g., protein A).

It will be understood that while some of the attributes between the respective instances are different, many are similar and provide insight into select similarities between the corresponding medicines. In addition, because of various interactive features described herein, a user may traverse the instances and select various similar and/or different attributes to gain better insight into the respective medicines.

By way of example, because the side effects between Medicine A and Medicine B are similar and because there is some (but not complete) overlap between the active ingredients of the selected medicines, a user could select one or more of the active ingredients, side effects, drug targets, or any other attribute(s) to filter out of the presentation or otherwise fine-tune the presentation to better identify correlations between various attributes that would not otherwise be possible with conventional systems. For instance, a user could traverse different views of the embeddings and associated clusters to determine that specific active ingredients and associated drug targets are associated with negative side effects like weight gain. As an alternative, a user may identify a medicine having similar active ingredients and drug targets, but which does not have a side-effect of weight gain. In this way, a researcher may develop conclusions or hypotheses associated with certain ingredients and associated side effects by filtering out or adding various attributes.

As indicated above, these example presentations illustrated in FIGS. 3A-4 as well as the various examples described in connection with one or more embodiments herein are provided by way of example and not limitation. Indeed, it will be understood that features and functionalities described in connection with these specific examples may apply to other examples discussed and illustrated herein. For example, any of the features described in connection with the example presentation related to oil well sites of FIGS. 3A-3B may apply to the presentation of medicine embeddings described in connection with FIG. 4. Moreover, examples such as movies and other multi-media entities described above may be applied to similar examples shown in FIGS. 3A-4.

Additional detail will now be given in connection with one or more use-cases associated with generating embeddings and providing presentations associated with collections of instances associated with different types of entities. It will be appreciated that features and functionalities associated with respective use-cases and entity-types may be applicable to one or more embodiments described herein.

As a first illustrative example, an entity class may refer to a complex entity of oil well sites. In accordance with one or more embodiments described above, an oil well site may have various simple attributes (e.g., atomic attributes) such as wells on the same pad, wells within a specific radius, wells under a business unit, wells being executed by a particular operator, offshore v. onshore, and conventional drilling v. unconventional drilling (e.g., fracking). Other attributes may be more complex and be associated with predicted deep-learned values such as indications of design, predicted execution events, casing design features, and predicted (or observed) drilling trajectory. In accordance with one or more embodiments described herein, a user may explore a presentation of an entity index to view similar wells by one or more of the above attributes (e.g., including the complex or deep-learned attributes) to view a combination of complex and atomic attributes associated with successful and/or unsuccessful well sites.

As a second illustrative example, an entity class may refer to a complex entity of medicines. In this example, medicines may have various simple attributes such as manufacturer, date of manufacturing, batch number, drug family, indication and contraindications, known side effects, and dosage. Other more complex attributes may provide notions of similarity by active ingredients, similarity by excipients, similarity by conditions and side effects, and similarity by drug targets. These signals may be deep learned or predicted based on unstructured digital content items, such as medical histories as well as content of other content items (e.g., scans, images, etc.)

As a third illustrative example, an entity class may refer to a complex entity of films, movies, or other multi-media content. Similar to the above examples, a collection of movies may be associated with simple or atomic attributes, such as a date, box office numbers, name(s) of actors or directors, a title of a movie, a length of the movie, and other data that can be tagged or associated with a corresponding movie. In accordance with one or more embodiments described above, attributes may also consider machine-learned, predicted, or otherwise complex attributes such as similarity of scores, shot selections, pacing, lighting, etc. Other examples are described above in connection with one or more embodiments.

Figure 5:
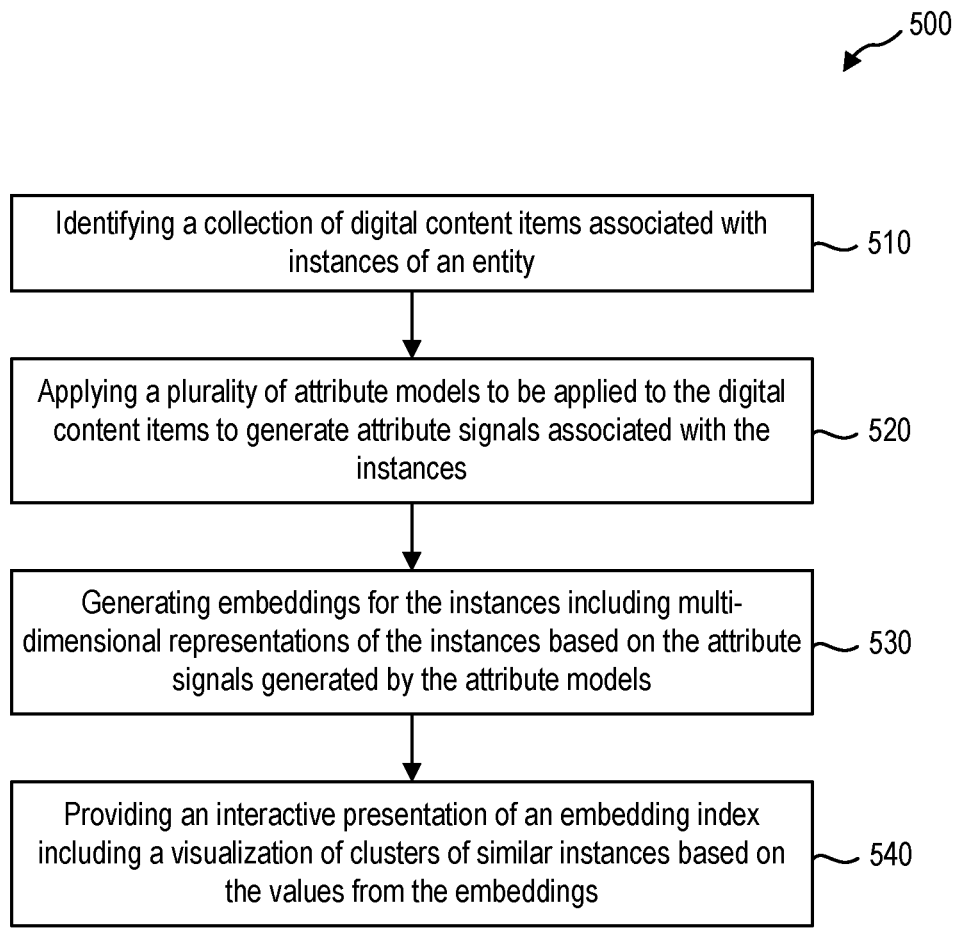
FIG. 5 illustrates an example series of acts for generating and presenting a complex entity index in accordance with one or more embodiments.

Turning now to FIG. 5, this figure illustrates example flowcharts including series of acts for generating embeddings and providing a presentation of an index in accordance with one or more embodiments described herein. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device to perform the acts of FIG. 5. In still further embodiments, a system can perform the acts of FIG. 5.

For example, FIG. 5 illustrates a series of acts 500 related to generating embeddings and providing a presentation of an index as discussed in connection with various implementations herein. As shown in FIG. 5, the series of acts 500 may include an act 510 of identifying a collection of digital content items associated with instances of an entity. For example, in one or more embodiments, the act 510 includes identifying a collection of digital content items including content associated with a plurality of instances of one or more entities.

As further shown, the series of acts 500 may include an act 520 of applying a plurality of attribute models to be applied to the digital content items to generate attribute signals associated with the instances. For example, in one or more embodiments, the act 520 involves causing a plurality of attribute models to be applied to the collection of digital content items to generate attribute signals associated with the collection of digital content items.

As further shown, the series of acts 500 may include an act 530 of generating embeddings for the instances including multi-dimensional representations of the instances based on the attribute signals generated by the attribute models. For example, in one or more embodiments, the act 530 involves generating embedding index including a collection of embeddings for the plurality of instances of the one or more entities, the collection of embeddings including multi-dimensional representations of the plurality of instances based on the attribute signals generated by the plurality of attribute models.

As further shown, the series of acts 500 may include an act 540 of providing an interactive presentation of an embedding index including a visualization of clusters of similar instances based on the values from the embeddings. For example, in one or more embodiments, the act 540 involves providing a presentation of the embedding index including an indication of one or more embedding clusters, the one or more embedding clusters including groupings of similar instances from the plurality of instances based proximity of the multi-dimensional representations within a multi-dimensional space of the embedding index.

In one or more embodiments, the instances refer to identified objects that fall into a category of objects inclusive of the one or more entities. Further, in one or more embodiments, the collection of digital content items includes digital content associated with respective instances of the plurality of instances. In one or more implementations, the collection of digital content items includes a set of multi-media content items including multi-media content that the plurality of attribute models are trained to evaluate and generate outputs based on the evaluated multi-media content. The collection of digital content items may also (or alternatively) include a set of documents including unstructured data that the plurality of attribute models are trained to evaluate and generate outputs based on the evaluated unstructured data.

In one or more embodiments, the plurality of attribute models include a plurality of deep learning models trained to output predicted attributes of the plurality of instances based on the collection of digital content items. In one or more embodiments, the plurality of attribute models includes a combination of attribute models including a first one or more attribute models trained to identify one or more atomic attribute signals based on metadata of the collection of digital content items and a second one or more attribute models trained to identify one or more deep learned signals based on content of the collection of digital content items.

In one or more embodiments, the multi-dimensional representations of the plurality of instances includes multi-dimensional vectors having numerical values associated with the attribute signals generated by the plurality of attribute models. In one or more embodiments, the presentation of the embedding index includes an interactive display of the embedding index showing icons representative of the plurality of instances within respective groupings of the one or more clusters. In one or more embodiments, the presentation of the embedding index includes at least one ranking of instances from the plurality of instances based on a similarity of the instances within a corresponding cluster.

In one or more embodiments, the series of acts 500 further includes detecting a selection of at least one attribute signal presented within the presentation of the embedding index. The series of acts 500 may also include generating an updated presentation of the embedding index showing an updated one or more clusters of similar instances in which the selected at least one attribute signal has been filtered out of consideration in determining similarity between instances of the plurality of instances.

In one or more embodiments, the series of acts 500 may include detecting a selection of at least one icon associated with a corresponding instance displayed within the presentation of the embedding index. The series of acts 500 may also include providing a display including one or more of a listing of attributes associated with the corresponding instance and/or a ranked listing of instances from the plurality of instances based on similarities between the listing of instances and the corresponding instance associated with the selected at least one icon.

Figure 6:
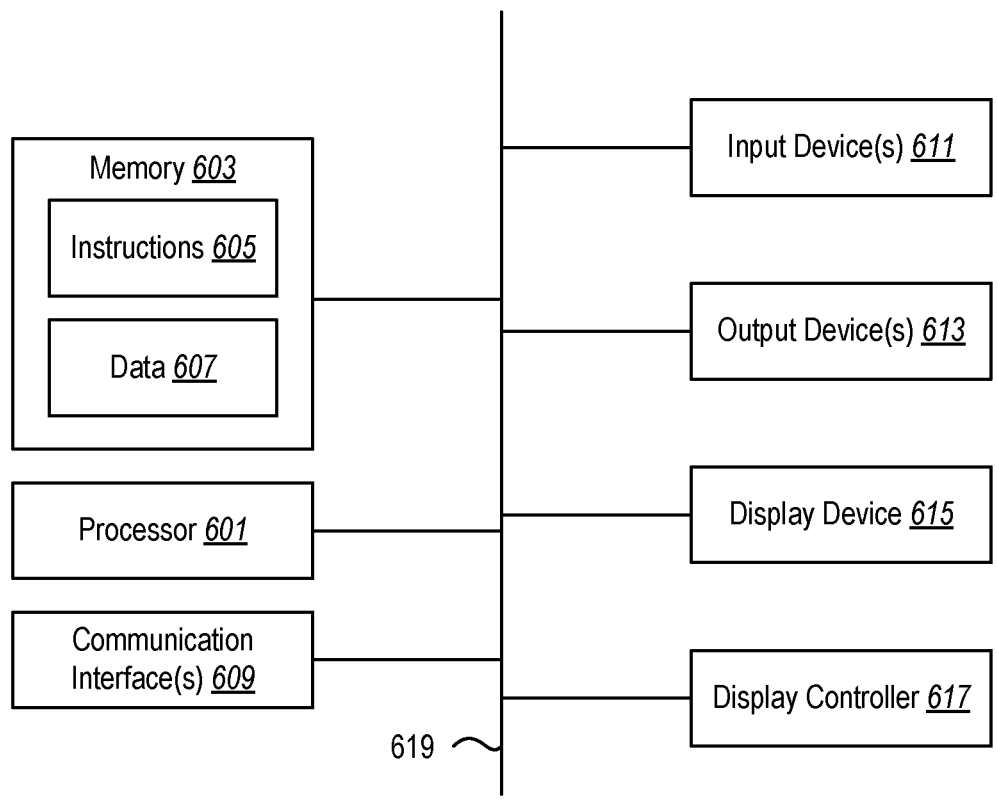
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 7 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    identifying a collection of digital content items including content associated with a plurality of instances of one or more entities;
    causing a plurality of attribute models to be applied to the collection of digital content items to generate attribute signals associated with the collection of digital content items, wherein the attribute signals include a combination of one or more atomic attribute signals and one or more deep learned attribute signals;
    generating an embedding index including a collection of embeddings for the plurality of instances of the one or more entities, the collection of embeddings including multi-dimensional representations of the plurality of instances based on the combination of one or more atomic attribute signals and one or more deep learned attribute signals generated by the plurality of attribute models, the multi-dimensional representations of the plurality of instances including multi-dimensional vectors having numeric values representative of the attribute signals, wherein generating the embedding index includes determining placements of the multi-dimensional vectors within a multi-dimensional space; and
    providing an interactive presentation of the embedding index on a graphical user interface of a client device, the presentation including an indication of one or more embedding clusters that are traversable via the interactive presentation by a user of the client device, the one or more embedding clusters including groupings of similar instances from the plurality of instances based on proximity of the determined placement of the multi-dimensional representations within the multi-dimensional space of the embedding index.

2. The method of claim 1, wherein the instances refer to identified objects that fall into a category of objects inclusive of the one or more entities.

3. The method of claim 1, wherein the collection of digital content items includes digital content associated with respective instances of the plurality of instances.

4. The method of claim 3, wherein the collection of digital content items includes one or more of:
- a set of multi-media content items including multi-media content that the plurality of attribute models are trained to evaluate and generate outputs based on evaluation of the multi-media content; or
- a set of documents including unstructured data that the plurality of attribute models are trained to evaluate and generate outputs based on evaluation of the unstructured data.

5. The method of claim 1, wherein the plurality of attribute models includes a plurality of deep learning models trained to output predicted attributes of the plurality of instances based on the collection of digital content items.

6. The method of claim 1, wherein the plurality of attribute models includes a combination of attribute models including a first one or more attribute models trained to identify the one or more atomic attribute signals based on metadata of the collection of digital content items and a second one or more attribute models trained to identify the one or more deep learned signals based on content of the collection of digital content items.

7. The method of claim 1, wherein the presentation of the embedding index includes an interactive display of the embedding index showing icons representative of the plurality of instances within respective groupings of the one or more embedding clusters.

8. The method of claim 1, wherein the presentation of the embedding index includes at least one ranking of instances from the plurality of instances based on a similarity of the instances within a corresponding cluster.

9. The method of claim 1, further comprising:
- detecting a selection of at least one attribute signal presented within the presentation of the embedding index;
- determining updated placements of the multi-dimensional vectors within the multi-dimensional space based on the selected at least one attribute signal being filtered out of the multi-dimensional representation of the plurality of instances; and
- generating an updated presentation of the embedding index showing an updated one or more embedding clusters based on the updated placements of the multi-dimensional vectors within the multi-dimensional space.

10. The method of claim 1, further comprising:
- detecting a selection of at least one icon associated with a corresponding instance displayed within the presentation of the embedding index; and
- providing a display including one or more of
  - a listing of attributes associated with the corresponding instance; or
  - a ranked listing of instances from the plurality of instances based on similarities between the listing of instances and the corresponding instance associated with the selected at least one icon.

11. A system, comprising:
- one or more processors;
- memory in electronic communication with the one or more processors; and
- instructions stored in the memory, the instructions being executable by the one or more processors to:
  - identify a collection of digital content items including content associated with a plurality of instances of one or more entities;
  - cause a plurality of attribute models to be applied to the collection of digital content items to generate attribute signals associated with the collection of digital content items, wherein the attribute signals include one or more atomic attribute signals and one or more deep learned attribute signals;
  - generate an embedding index including a collection of embeddings for the plurality of instances of the one or more entities, the collection of embeddings including multi-dimensional representations of the plurality of instances based on the attribute signals generated by the plurality of attribute models, the multi-dimensional representations of the plurality of instances including multi-dimensional vectors having numeric values representative of the attribute signals, wherein generating the embedding index includes determining placements of the multi-dimensional vectors within a multi-dimensional space; and
  - provide an interactive presentation of the embedding index on a graphical user interface of a client device, the presentation including an indication of one or more embedding clusters that are traversable via the interactive presentation by a user of the client device, the one or more embedding clusters including groupings of similar instances from the plurality of instances based on proximity of the determined placement of the multi-dimensional representations within the multi-dimensional space of the embedding index.

12. The system of claim 11, wherein the instances refer to identified objects that fall into a category of objects inclusive of the one or more entities, and wherein the collection of digital content items includes digital content associated with respective instances of the plurality of instances.

13. The system of claim 11, wherein the plurality of attribute models includes a plurality of deep learning models trained to output predicted attributes of the plurality of instances based on the collection of digital content items.

14. The system of claim 11, wherein the plurality of attribute models includes a combination of attribute models including a first one or more attribute models trained to identify the one or more atomic attribute signals based on metadata of the collection of digital content items and a second one or more attribute models trained to identify the one or more deep learned signals based on content of the collection of digital content items.

15. The system of claim 11, wherein the presentation of the embedding index includes an interactive display of the embedding index showing icons representative of the plurality of instances within respective groupings of the one or more embedding clusters.

16. The system of claim 11, further comprising instructions being executable by the one or more processors to:
- detect a selection of at least one attribute signal presented within the presentation of the embedding index;
- determine updated placements of the multi-dimensional vectors within the multi-dimensional space based on the selected at least one attribute signal being filtered out of the multi-dimensional representation of the plurality of instances; and
- generate an updated presentation of the embedding index showing an updated one or more embedding clusters based on the updated placements of the multi-dimensional vectors within the multi-dimensional space.

17. A non-transitory computer readable medium storing instructions thereon that, when executed by one or more processors, causes a computing device to:
- identify a collection of digital content items including content associated with a plurality of instances of one or more entities;
- cause a plurality of attribute models to be applied to the collection of digital content items to generate attribute signals associated with the collection of digital content items, wherein the attribute signals include one or more atomic attribute signals and one or more deep learned attribute signals;
- generate an embedding index including a collection of embeddings for the plurality of instances of the one or more entities, the collection of embeddings including multi-dimensional representations of the plurality of instances based on the attribute signals generated by the plurality of attribute models, the multi-dimensional representations of the plurality of instances including multi-dimensional vectors having numeric values representative of the attribute signals, wherein generating the embedding index includes determining placements of the multi-dimensional vectors within a multi-dimensional space; and
- provide an interactive presentation of the embedding index on a graphical user interface of a client device, the presentation including an indication of one or more embedding clusters that are traversable via the interactive presentation by a user of the client device, the one or more embedding clusters including groupings of similar instances from the plurality of instances based on proximity of the determined placement of the multi-dimensional representations within the multi-dimensional space of the embedding index.

18. The non-transitory computer readable medium of claim 17, wherein the instances refer to identified objects that fall into a category of objects inclusive of the one or more entities, and wherein the collection of digital content items includes digital content associated with respective instances of the plurality of instances.

19. The non-transitory computer readable medium of claim 17, wherein the plurality of attribute models includes a combination of attribute models including a first one or more attribute models trained to identify the one or more atomic attribute signals based on metadata of the collection of digital content items and a second one or more attribute models trained to identify the one or more deep learned signals based on content of the collection of digital content items.

20. The non-transitory computer readable medium of claim 17, wherein the presentation of the embedding index includes an interactive display of the embedding index showing icons representative of the plurality of instances within respective groupings of the one or more embedding clusters.

* * * * *